(12) United States Patent
Xiong et al.

(10) Patent No.: US 10,412,726 B2
(45) Date of Patent: Sep. 10, 2019

(54) METHOD AND APPARATUS FOR X2 SIGNALLING

(71) Applicant: Alcatel Lucent, Boulogne Billancourt (FR)

(72) Inventors: Zhilan Xiong, Shanghai (CN); Min Zhang, Swindon (GB); Hakon Helmers, Sceaux (FR); Zizhou Wang, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 15/114,556

(22) PCT Filed: Jan. 20, 2015

(86) PCT No.: PCT/IB2015/000191
§ 371 (c)(1),
(2) Date: Jul. 27, 2016

(87) PCT Pub. No.: WO2015/114457
PCT Pub. Date: Aug. 6, 2015

(65) Prior Publication Data
US 2016/0345309 A1    Nov. 24, 2016

(30) Foreign Application Priority Data
Jan. 30, 2014 (CN) .......................... 2014 1 0045262

(51) Int. Cl.
*H04B 7/06* (2006.01)
*H04W 72/04* (2009.01)
(Continued)

(52) U.S. Cl.
CPC ...... *H04W 72/0426* (2013.01); *H04B 7/0617* (2013.01); *H04J 11/0053* (2013.01);
(Continued)

(58) Field of Classification Search
None
See application file for complete search history.

(56) References Cited

U.S. PATENT DOCUMENTS 8,798,021 B2 * 8/2014 Mangalvedhe ....... H04W 24/02
370/338
2010/0033374 A1 * 2/2010 van Rensburg ....... H01Q 1/246
342/368
(Continued)

FOREIGN PATENT DOCUMENTS

CN       101729130 A     6/2010
CN       102355292 A     2/2012
(Continued)

OTHER PUBLICATIONS

Zhang Liang et al., "Field Experiment of Network Control Architecture for CoMP JT in LTE-Advanced over Asynchronous X2 Interface," 2013 IEEE 77th Vehicular Technology Conference, 5 pages, XP032547895, 2013.
(Continued)

*Primary Examiner* — Brian S Roberts
(74) *Attorney, Agent, or Firm* — Fay Sharpe LLP

(57) ABSTRACT

The present disclosure provides a method and apparatus for X2 signaling. The method comprises, in a wireless communication network supporting coordinated multiple point transmission, transmitting load information from a first base station to at least one second base station via X2 signaling, wherein the load information comprises at least one item of i) a relative narrowband beam information element or ii) a relative narrowband scheduling information element. Current X2 signaling is enhanced to support coordinated multiple point transmission with non-ideal backhaul and improve interference coordination.

13 Claims, 3 Drawing Sheets

(51) Int. Cl.
*H04J 11/00* (2006.01)
*H04L 5/00* (2006.01)
*H04W 72/12* (2009.01)
*H04B 7/024* (2017.01)
*H04W 92/20* (2009.01)
*H04W 84/04* (2009.01)

(52) U.S. Cl.
CPC ....... *H04L 5/0035* (2013.01); *H04W 72/0486* (2013.01); *H04W 72/1231* (2013.01); *H04B 7/024* (2013.01); *H04W 84/042* (2013.01); *H04W 92/20* (2013.01)

(56) References Cited

U.S. PATENT DOCUMENTS

| | | | |
|---|---|---|---|
| 2010/0151876 A1 | 6/2010 | Park et al. | |
| 2010/0291940 A1* | 11/2010 | Koo | H04B 7/024 455/450 |
| 2012/0329498 A1* | 12/2012 | Koo | H04J 11/005 455/501 |
| 2012/0331478 A1 | 12/2012 | Zhu et al. | |
| 2013/0115999 A1 | 5/2013 | Sirotkin et al. | |
| 2013/0155975 A1 | 6/2013 | Dinan | |
| 2013/0176953 A1* | 7/2013 | Stern-Berkowitz | H04W 52/146 370/329 |
| 2014/0254537 A1 | 9/2014 | Kim et al. | |

FOREIGN PATENT DOCUMENTS

| | | |
|---|---|---|
| CN | 102378308 A | 3/2012 |
| CN | 103079210 A | 5/2013 |
| WO | 2012/089237 A1 | 7/2012 |
| WO | WO 2013/062356 A2 | 5/2013 |

OTHER PUBLICATIONS

Alcatel-Lucent et al., "Proposals for X2 signalling Supporting eCoMP with NIB," 3$^{rd}$ Generation Partnership Project (3GPP), 3GPP TSG RAN WG1 Meeting #75, R1-135181, pp. 1-7, XP050734879, San Francisco, USA, Nov. 11-15, 2013.

Alcatel-Lucent Shanghai Bell et al., "Performance Evaluation of X2 Signalling Supporting DL eCoMP with NIB," 3$^{rd}$ Generation Partnership Project (3GPP), 3GPP TSG RAN WG1 Meeting #75, R1-135890, pp. 1-7, XP050735500, San Francisco, USA, Nov. 11-15, 2013.

International Search Report for PCT/IB2015/000191 dated Sep. 2, 2015.

* cited by examiner

METHOD AND APPARATUS FOR X2 SIGNALLING

FIELD OF THE INVENTION

The present disclosure generally relates to a wireless communication system, and more specifically to a method and apparatus for X2 signaling.

BACKGROUND OF THE INVENTION

Coordinated Multiple Point ("CoMP") transmission has been widely studied in 3GPP Rel 11 with the assumption of ideal backhaul and centralized scheduling. It will be further enhanced in Rel 12 with more realistic network assumptions and non-ideal backhaul. All solutions on resource allocation in power/spatial/scheduling/time/frequency domain have been discussed in 3GPP LTE-A RAN#1 for eCoMP Rel 12. Detailed signalling for the resource allocation solutions above would be discussed in 3GPP LTE-A RAN#3.

For this reason, X2 signalling in the prior art needs to be improved to support centralized and distributed multi-eNB cooperation with non-ideal backhaul.

SUMMARY OF THE INVENTION

To solve at least some of the above technical problems, exemplary embodiments of the present disclosure propose a plurality of different information elements to improve X2 signal to support centralized and distributed multi-eNB cooperation and facilitate interference coordination.

According to one aspect of the present disclosure, there is provided a method of performing signaling transmission in a wireless communication network supporting coordinated multiple point transmission. The method comprises transmitting load information from a first base station to at least one second base station via X2 signaling, wherein the load information comprises at least one item of relative narrowband beam information element or relative narrowband scheduling information element.

In an embodiment, the load information further comprises at least one item of relative narrowband transmission power information element, relative narrowband transmission power and beam information element or relative narrowband resource restriction information element.

In another embodiment, the relative narrowband beam information element is used to indicate DL beam restriction per PRB, per subband, per wideband, per carrier or per subframe in a cell and information needed by said at least one second base station upon performing interference aware scheduling.

In a further embodiment, the relative narrowband beam information element comprises at least one item of a narrowband beam list and number of antenna ports, and the relative narrowband beam list comprises at least one relative narrowband beam information item, wherein each relative narrowband beam information item comprises at least one item of relative narrowband beam pattern information, beam indication, rank indication and relative narrowband beam type.

In an embodiment, the relative narrowband beam information element comprises at least one item of relative narrowband beam list, number of antenna ports and transmission mode, wherein the relative narrowband beam list comprises at least one relative narrowband beam information item, wherein each relative narrowband beam information item comprises: at least one item of relative narrowband beam pattern information, beam information and relative narrowband beam type, and wherein the beam information comprises at least one beam information item, wherein each beam information item comprises at least one item of beam indication and rank indication, or the beam information comprises at least one item of codebook subset restriction and transmission mode.

In another embodiment, the relative narrowband beam pattern information in a time domain comprises at least one item of relative narrowband beam pattern information, number of cell-specific antenna ports, measurement subset and relative narrowband beam non-activation in a frequency division duplex mode or time division duplex mode.

In a further embodiment, the relative narrowband scheduling information element is used to indicate scheduling restriction per physical resource block, per subband, per wideband, per carrier or per subframe in a cell and information needed by said at least one second base station upon performing interference aware scheduling.

In an embodiment, the relative narrowband scheduling information element comprises at least one item of a relative narrowband scheduling information list, a user equipment information list and a relative narrowband scheduling type, the relative narrowband scheduling information list comprises at least one relative narrowband scheduling information item, wherein the number of relative narrowband scheduling information items in the list does not exceed a maximum value of the number of the defined relative narrowband scheduling information items, and each relative narrowband scheduling information item comprises relative narrowband scheduling pattern information, wherein the user equipment information list comprises at least one item of a global base station identifier, X2AP identifiers of base station and user equipment, a user identifier and a configuration for channel information.

In another embodiment, the relative narrowband scheduling pattern information in the time domain comprises at least one item of relative narrowband scheduling pattern information, number of cell-specific antenna ports, measurement subset and relative narrowband scheduling non-activation in a frequency division duplex mode or time division duplex mode.

In a further embodiment, the relative narrowband transmission power and beam information element are used to indicate restriction of at least one item of downlink transmission function or beam per PRB, per subband, per wideband, per carrier or per subframe in a cell and information needed by said at least one second base station upon performing interference aware scheduling.

In another embodiment, the relative narrowband transmission power and beam information element comprise at least one item of relative narrowband transmission power and beam information list, number of antenna ports and transmission mode, wherein the relative narrowband transmission power and beam information list comprise at least one relative narrowband transmission power and beam information item, wherein each relative narrowband transmission power and beam information item comprise at least one item of relative narrowband transmission power and beam pattern information, a relative narrowband transmission power threshold, a beam indication, a rank indication and a beam restriction type.

In an embodiment, the relative narrowband scheduling pattern information in the time domain comprises at least one item of relative narrowband transmission power and beam pattern information, number of cell-specific antenna ports, measurement subset and relative narrowband transmission power and beam non-activation in a frequency division duplex mode or time division duplex mode.

In a further embodiment, the relative narrowband resource restriction information element is used to indicate resource restriction per physical resource block, per subband, per wideband, per carrier or per subframe in a cell and information needed by said at least one second base station upon performing interference aware scheduling.

In a further embodiment, the relative narrowband resource restriction information element comprises at least one item of a relative narrowband resource restriction information list, user equipment information list, a user equipment restriction type and the number of antenna ports, wherein the relative narrowband resource restriction information list comprises at least one relative narrowband resource restriction information item, wherein each relative narrowband resource restriction information item comprises at least one item of the relative narrowband resource restriction pattern information, a relative narrowband transmission function threshold, a beam indication, and a beam restriction type, and the user equipment information list comprises at least one item of a global base station identifier, X2AP identifiers of base station and user equipment, a user identifier and a configuration for channel information.

In another embodiment, the relative narrowband resource restriction pattern information in the time domain comprises at least one item of relative narrowband resource restriction pattern information, number of cell-specific antenna ports, a measurement subset and relative narrowband resource restriction non-activation in a frequency division duplex mode or time division duplex mode.

In an additional embodiment, the load information further comprises an invoking indication, wherein the invoking indication comprises at least one item of the relative narrowband beam information element, relative narrowband scheduling information element, relative narrowband transmission power information element, relative narrowband transmission power and beam information element or relative narrowband resource restriction information element about the at least one second base station sent back from the at least one second base station to the first base station.

According to another aspect of the present disclosure, there is provided a method of using the load information in any one of the above items. The method comprises adding an identifier of a central node of coordinated multiple point transmission to the load information as an identifier of a transmitter. The method further comprises transmitting the load information with the identifier added as a resource allocation request to a receiving base station indicated in the load information.

In an embodiment, the relative narrowband transmission power information element included in the load information comprises the setting of a maximum transmission power.

According to a further aspect of the present disclosure, there is provided a method of performing resource allocation in a wireless communication network supporting coordinated multiple point transmission. The method comprises transmitting a resource allocation information message from a central node in the coordinated multiple point transmission to at least one base station, wherein the resource allocation information message comprises an identifier of the central node as a transmitter and an identifier of the at least one base station as a receiver, wherein the resource allocation message further comprises at least one item of the relative narrowband beam information element, the relative narrowband scheduling information element, relative narrowband transmission power information element, relative narrowband transmission power and beam information element, relative narrowband resource restriction information element or almost blank subframe information.

In an embodiment, the relative narrowband transmission power information element comprises the setting of a maximum transmission power.

According to a further aspect of the present disclosure, there is provided an apparatus for performing signaling transmission in a wireless communication network supporting coordinated multiple point transmission. The apparatus comprises a transmitting unit for transmitting load information from a first base station to at least one second base station via X2 signaling, wherein the load information comprises at least one item of relative narrowband beam information element or relative narrowband scheduling information element. In an embodiment, the load information further comprises at least one of relative narrowband transmission power information element, relative narrowband transmission power and beam information element or relative narrowband resource restriction information element.

According to a further aspect of the present disclosure, there is provided an apparatus using the load information stated in any one of the above-mentioned methods, comprising: an adding unit for adding an identifier of a central node of coordinated multiple point transmission to the load information as an identifier of a transmitter, and a transmitting unit for transmitting the load information with the identifier added as a resource allocation request to a receiving base station indicated in the load information.

According to a further aspect of the present disclosure, there is provided an apparatus for performing resource allocation in a wireless communication network supporting coordinated multiple point transmission. The apparatus comprises a transmitting unit for transmitting a resource allocation information message from the central node in the coordinated multiple point transmission to at least one base station, wherein the resource allocation information message comprises an identifier of the central node as a transmitter and an identifier of the at least one base station as a receiver, wherein the resource allocation message further comprises at least one item of a relative narrowband beam information element, a relative narrowband scheduling information element, a relative narrowband transmission power information element, a relative narrowband transmission power and beam information element, a relative narrowband resource restriction information element or almost blank subframe information in the above-mentioned load information.

Although not specifically illustrated here, the apparatus of the above embodiments of the present disclosure may comprise various units for implementing the foresaid aspects and steps of the methods of the embodiments.

With the method and apparatus according to multiple aspects and embodiments of the present disclosure, current X2 signaling is enhanced to support coordinated multiple point transmission with non-ideal backhaul and improve interference coordination.

BRIEF DESCRIPTION OF DRAWINGS

The above and other objects, features and advantages of the present disclosure will be made apparent through the following detailed description of exemplary embodiments with reference to figures. In the figures.

DETAILED DESCRIPTION OF PREFERRED EMBODIMENTS

Figure 1:
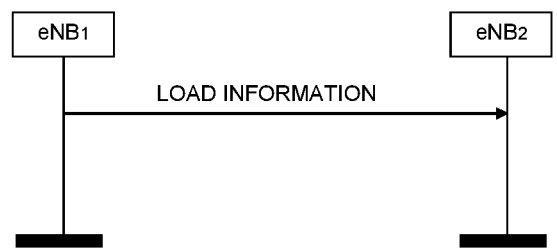
FIG. 1 illustrates a diagram of a network architecture according to an embodiment of the present disclosure.

According to a plurality of exemplary embodiments of the present disclosure, it is proposed that in load information ("LOAD INFORMATION") is added the following information for resource allocation indication:

RNB signaling for beam allocation indication and RNS signaling for scheduling allocation indication;

Relative narrowband transmission power and beam (RN-TPB) signaling and relative narrowband resource-restriction (RNR) signaling by combining RNTP, RNB and/or RNS.

Extended RNTP/RNB/RNS/RNTPB/RNR in time domain.

Additionally, it is further proposed that the following information be added in a resource allocation request from a central node ("CN") to eNB:

Propose to extend LOAD INFORMATION to support the function of resource allocation request.

Propose to add new "resource allocation information" message to support this function.

Proposed to extend RNTP with maximal power setting for resource allocation request.

Note that a physical resource block ("PRB")-level granularity according to the present disclosure could be replaced by subband-level and/or wideband-level granularity.

1. Resource Allocation Indication

This part of the description proposes mechanisms of resource allocation indication over X2 interface for RNTP enhancement in power/spatial/scheduling domain. The enhanced signaling here is related to "Load information". In the "Load information", the present disclosure proposes to add "RNB" and "RNS". In the end of this part, the present disclosure further proposes corresponding enhanced solution in time domain.

1.1 Enhanced Resource Allocation Information Indication

This section proposes five different information elements ("IEs") for "RNB", "RNTPB", "RNS" and "RNR". Note that besides PRB-level granularity used below, following examples could use subband-level, subcarrier, subframe granularity and/or wideband-level granularity.

RNB [Proposal#1]

Example 1 for RNB:

| IE/Group Name | |
|---|---|
| RNB Information List | |
| RNB Information Item | Range: 1 . . . <maxBeam> |
| RNB Pattern Info | Presence: [M] |
| | IE type and reference: BIT STRING (6 . . . 110, . . .) |
| | Semantics description: Each position in the bitmap represents a $n_{PRB}$ value (i.e. first bit = PRB 0 and so on), for which the bit value presents beam restriction. Value 0 indicates the used beam(s) is satisfied with the restriction indicated by 'Beam Indication', 'Rank Indication' and 'RNB Type'. Value 1 indicates 'no promise on the beam restriction is given'. |
| Beam Indication | Presence: [M] |
| | IE type and reference: INTEGER |
| | Semantics description: Indicate corresponding beam |
| Rank Indication | Presence: [M] |
| | IE type and reference: INTEGER (1 . . . 8) |
| | Semantics description: Indicate corresponding rank number, or If there is no beam indication, then the rank indication indicates the maximal rank number restriction. |
| RNB Type | Presence: [M] |
| | IE type and reference: BIT (1) |
| | Semantics description: 0: Restrict to use this beam; 1: prefer to use this beam |
| Number of Antenna Ports (for example CSI-RS antenna port) | Presence: [M] |
| | IE type and reference: INTEGER (1, 2, 4, . . .) |
| | Semantics description: P (number of antenna ports used for transmission of CSI reference signals) defined in TS 36.211. |

Note that: maxBeam denotes the maximal number of beam restrictions in one cell.

Example 2 for RNB:

| IE/Group Name | |
|---|---|
| RNB Information List | |
| RNB Information Item | Range: 1 . . . <maxBeam> |
| RNB Pattern Info | Presence: [M]<br>IE type and reference: BIT STRING (6 . . . 110, . . .)<br>Semantics description: Each position in the bitmap represents a $n_{PRB}$ value (i.e. first bit = PRB 0 and so on), for which the bit value presents beam restriction. Value 0 indicates the used beam(s) is satisfied with the restriction indicated by 'Beam Indication', 'Rank Indication' and 'RNB Type'. Value 1 indicates 'no promise on the beam restriction is given'. |
| Beam Information | |

The beam information could be described as

| Beam Information Item | Range: 1 . . . <maxBeam2> |
|---|---|
| Beam Indication | Presence: [M]<br>IE type and reference: INTEGER<br>Semantics description: Indicate corresponding beam |
| Rank Indication | Presence: [M]<br>IE type and reference: INTEGER (1 . . . 8)<br>Semantics description: Indicate corresponding rank number. or<br>If there is no beam indication, then the rank indication indicates the maximal rank number restriction. |

Or

| codebookSubSetRestriction | Presence: [M]<br>IE type and reference: BIT STRING (2 . . . 109) |
|---|---|
| Transmission mode | For n2TxAntenna and TM3, size = 2<br>For n4TxAntenna and TM3, size = 4<br>For n2TxAntenna and TM4, size = 6<br>For n4TxAntenna and TM4, size = 64<br>For n2TxAntenna and TM5, size = 4<br>For n4TxAntenna and TM5, size = 16<br>For n2TxAntenna and TM6, size = 4<br>For n4TxAntenna and TM6, size = 16<br>For n2TxAntenna and TM8, size = 6<br>For n4TxAntenna and TM8, size = 32<br>For n2TxAntenna and (TM9 or TM10), size = 6<br>For n4TxAntenna and (TM9 or TM10), size = 64<br>For n8TxAntenna and (TM9 or TM10), size = 109<br>Presence: [M]<br>IE type and reference: INTEGER (1 . . . 10)<br>Semantics description: Indicate transmission mode |
| RNB Type | Presence: [M]<br>IE type and reference: BIT (1)<br>Semantics description: 0: Restrict to use this beam; 1: prefer to use this beam |
| Number of Antenna Ports (for example CSI-RS antenna port) | Presence: [M]<br>IE type and reference: INTEGER (1, 2, 4, . . .)<br>Semantics description: P (number of antenna ports used for transmission of CSI reference signals) defined in TS 36.211. |

Note that [M] indicates an item that must be selected and maxBeam2 denotes the maximal number of beam restrictions in one Beam Information Item. In addition, an information element may only have one transmission mode indication, similar to the number of antenna ports.

RNTPB [Proposal#2]

The RNTPB IE provides an indication on DL transmission power and/or beam restriction per PRB, per subband, per wideband, per carrier or per subframe in a cell and other information needed by a neighbor eNB for interference aware scheduling.

| IE/Group Name | |
|---|---|
| RNTPB Information List | |
| RNTPB Information Item | Range: 1 . . . <maxResourceRestriction> |
| RNTPB Pattern Info | Presence: [M]<br>IE type and reference: BIT STRING (6 . . . 110, . . .)<br>Semantics description: Each position in the bitmap represents a $n_{PRB}$ value (i.e. first bit = PRB 0 and so on), for which the bit value presents resource restriction. Value 0 indicates the used resources are satisfied with the restriction indicated by 'Restriction Information' (if RNTP threshold is valid, then meanwhile Tx not exceeding RNTP threshold). Value 1 indicates 'no promise on the restriction is given'. |
| RNTP Threshold | Presence: [O]<br>IE type and reference: ENUMERATED (−∞, −11, −10, −9, −8, −7, −6, −5, −4, −3, −2, −1, 0, 1, 2, 3, . . .)<br>Semantics description: $RNTP_{threshold}$ is defined in TS 36.213 |
| Beam Indication | Presence: [O]<br>IE type and reference: INTEGER<br>Semantics description: Indicate corresponding beam |
| Rank Indication | Presence: [O]<br>IE type and reference: INTEGER (1 . . . 8)<br>Semantics description: Indicate corresponding beam |
| Beam Restriction Type | Presence: [O]<br>IE type and reference: BIT (1)<br>Semantics description: 0: Restrict to use this beam; 1: Use this beam |
| Number of Antenna Ports (for example CSI-RS antenna port) | Presence: [M]<br>IE type and reference: INTEGER (1, 2, 4, . . .)<br>Semantics description: P (number of antenna ports used for transmission of CSI reference signals) defined in TS 36.211. |

Note that [O] is an optional item and maxResourceRestriction denotes the maximal number of resource restrictions (power and beam) in one cell.

Similar to the example 2 in RNB, the 'Beam Indication' and 'Rank Indication' in the example above could be replaced by Beam Information in order to support multi-beam indication for one RNTPB Pattern Info.

RNS [Proposal#3]

The RNS IE provides an indication on scheduling restriction per PRB, per subband, per wideband, per carrier or per subframe in a cell and other information needed by a neighbor eNB for interference aware scheduling.

| IE/Group Name | |
|---|---|
| RNS Information List | |
| RNS Information Item | Range: 1 . . . <maxUESchedulingRestriction> |
| RNS Pattern Info | Presence: [M] |
| | IE type and reference: BIT STRING (6 . . . 110, . . .) |
| | Semantics description: Each position in the bitmap represents a $n_{PRB}$ value (i.e. first bit = PRB 0 and so on), for which the bit value presents resource restriction. Value 0 indicates the used resources are satisfied with the restriction indicated by 'Restriction Information'. Value 1 indicates 'no promise on the restriction is given'. |
| UE Information List | Range: 1 . . . <maxUESchedulingRestriction2> |
| Global eNB ID | Presence: [M] |
| | IE type and reference: 9.2.22 |
| eNB UE X2AP ID | Presence: [M] |
| | IE type and reference: INTEGER (0 . . . 4095) |
| | Semantics description: Allocated at the source eNB |
| Configuration for channel information (for example SRS configuration information) | The information to get the channel information. (In TDD, it could be SRS configuration information which could include corresponding UE ID information.) |
| RNS type | Presence: [O] |
| | IE type and reference: BIT (1) |
| | Semantics description: 0: Avoid to schedule indicated UE set; 1: Possibly schedule indicated UE set |

Note that:
maxUESchedulingRestriction denotes the maximal number (UEScheduling) of resource restrictions in one cell.
maxUESchedulingRestriction2 denotes the maximal UE number of scheduling restrictions in one UE information.

RNR [Proposal#4]

The RNR IE provides an indication on resource restriction per PRB, per subband, per wideband, per carrier or per subframe in a cell and other information needed by a neighbor eNB for interference aware scheduling.

| IE/Group Name | |
|---|---|
| RNR Information List | |
| RNR Information Item | Range: 1 . . . <maxResourceRestriction> |
| RNR Pattern Info | Presence: [M] |
| | IE type and reference: BIT STRING (6 . . . 110, . . .) |
| | Semantics description: Each position in the bitmap represents a $n_{PRB}$ value (i.e. first bit = PRB 0 and so on), for which the bit value presents resource restriction. Value 0 indicates the used resources are satisfied with the restriction indicated by 'Restriction Information'. Value 1 indicates 'no promise on the restriction is given'. |
| RNTP Threshold | Presence: [O] |
| | IE type and reference: ENUMERATED (−∞, −11, −10, −9, −8, −7, −6, −5, −4, −3, −2, −1, 0, 1, 2, 3, . . .) |
| | Semantics description: $RNTP_{threshold}$ is defined in TS 36.213 |
| Beam Indication | Presence: [O] |
| | IE type and reference: INTEGER |
| | Semantics description: Indicate corresponding beam |
| Rank Indication | Presence: [O] |
| | IE type and reference: INTEGER (1 . . . 8) |
| | Semantics description: Indicate corresponding beam |
| Beam Restriction | Presence: [O] |

| IE/Group Name | |
|---|---|
| RNR Information List | |
| Type | IE type and reference: BIT (1) |
| | Semantics description: 0: Restrict to use this beam; 1: Use this beam |
| UE Information List | Range: 1 . . . <maxUESchedulingRestriction2> |
| Global eNB ID | Presence: [M] |
| | IE type and reference: 9.2.22 |
| eNB UE X2AP ID | Presence: [M] |
| | IE type and reference: INTEGER (0 . . . 4095) |
| | Semantics description: Allocated at the source eNB |
| Configuration for channel information (for example SRS configuration information) | The information to get the channel information. (In TDD, it could be SRS configuration information which could include corresponding UE ID information.) |
| UE restriction type | Presence: [O] |
| | IE type and reference: BIT (1) |
| | Semantics description: 0: Avoid to schedule indicated UE set; 1: Possibly schedule indicated UE set |
| Number of Antenna Ports (for example CSI-RS antenna port) | Presence: [M] |
| | IE type and reference: INTEGER (1, 2, 4, . . .) |
| | Semantics description: P (number of antenna ports used for transmission of CSI reference signals) defined in TS 36.211. |

Note that:

maxResourceRestriction denotes the maximal number of resource restrictions (power and beam) in one cell.

Similar to the example 2 in RNB, the 'Beam Indication' and 'Rank Indication' in the example above could be replaced by Beam Information in order to support multi-beam indication for one RNR Pattern Info.

1.2 Mechanisms for Enhanced-RNTP Indication

In the existing X2 signaling as shown in FIG. 1, the purpose of the Load Indication procedure is to transfer load and interference co-ordination information between eNBs controlling intra-frequency neighboring cells. As shown in FIG. 1, eNB1 initiates the procedure by transmitting LOAD INFORMATION message to eNB2 controlling intra-frequency neighbouring cells.

Existing LOAD INFORMATION message includes the following information:
  Message Type
  Cell Information with multiple Cell Information Items.
    Each item includes:
    Cell ID
    UL Interference Overload Indication
    UL High Interference Information
    RNTP
    ABS Information
    Invoke Indication (the Invoke Indication IE indicates which type of information the transmitting eNB (e.g., eNB1 in the figure) would like the receiving eNB to send back. Existing Invoke Indication IE is only valid for ABS Information.)

Based on the above current LOAD INFORMATION, the present disclosure proposes the following proposal #5:

One Cell Information Item in LOAD INFORMATION message could include RNB, RNTPB, RNS and/or RNR.

The value of the Invoke Indication IE could be set to RNTP, RNB, RNTPB, RNS and/or RNR.

If RNB IE is received in the LOAD INFORMATION message, it indicates, per PRB, per subband, per wideband, per carrier or per subframe whether the indicated beam(s) is/are restricted. The receiving eNB may take such information into account when setting its scheduling policy and shall consider the received RNB IE value valid until reception of a new LOAD INFORMATION message carrying an update.

If RNTPB IE is received in the LOAD INFORMATION message, it indicates, per PRB, per subband, per wideband, per carrier or per subframe, whether the indicated transmission power/beam(s) is/are restricted. The receiving eNB may take such information into account when setting its scheduling policy and shall consider the received RNTPB IE value valid until reception of a new LOAD INFORMATION message carrying an update.

If RNS IE is received in the LOAD INFORMATION message, it indicates, per PRB, per subband, per wideband, per carrier or per subframe, whether the indicated scheduling is/are restricted. The receiving eNB may take such information into account when setting its scheduling policy and shall consider the received RNS IE value valid until reception of a new LOAD INFORMATION message carrying an update.

If RNR IE is received in the LOAD INFORMATION message, it indicates, per PRB, per subband, per wideband, per carrier or per subframe, whether the indicated information is/are restricted. The receiving eNB may take such information into account when setting its scheduling policy and shall consider the received RNR IE value valid until reception of a new LOAD INFORMATION message carrying an update.

1.3 Enhancement in Time Domain [Proposal#6]

The pattern information in "RNB", "RNTPB", "RNS" and "RNR" proposed in section 1 could be defined in time domain too. It may also be defined in time domain through the following exemplary list of the present disclosure below.

| FDD: xxx Pattern Info | Presence: [M] |
|---|---|
| | IE type and reference: BIT STRING (SIZE(40)) |
| | Semantics description: Each position in the bitmap represents a DL subframe, for which value "1" indicates 'restriction to corresponding information' and value "0" is 'no restriction to corresponding information'. The first position of the xxx pattern corresponds to subframe 0 in a radio frame where SFN = 0. The xxx pattern is continuously repeated in all radio frames. The maximum number of subframes is 40. |

-continued

| | |
|---|---|
| FDD: Number of Cell-specific Antenna Ports | Presence: [M]<br>IE type and reference: INTEGER (1, 2, 4, . . .)<br>Semantics description: P (number of antenna ports for cell-specific reference signals) defined in TS 36.211. |
| FDD: Measurement Subset | Presence: [M]<br>IE type and reference: BIT STRING (SIZE(40))<br>Semantics description: Indicates a subset of FDD: xxx Pattern Info and is used to configure specific measurements towards the UE. |
| TDD: xxx Pattern Info | Presence: [M]<br>IE type and reference: BIT STRING (1 . . . 70)<br>Semantics description: Each position in the bitmap represents a subframe, for which value "1" indicates 'restriction to corresponding information' and value "0" is 'no restriction to corresponding information' which is applicable only in positions corresponding to the DL direction. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. The first position of the xxx pattern corresponds to subframe 0 in a radio frame where SFN = 0. The xxx pattern is continuously repeated in all radio frames, and restarted each time SFN = 0. |
| TDD: Measurement Subset | Presence: [M]<br>IE type and reference: BIT STRING (SIZE(40))<br>Semantics description: Indicates a subset of TDD: xxx Pattern Info and is used to configure specific measurements towards the UE. |
| TDD: Number of Cell-specific Antenna Ports | Presence: [M]<br>IE type and reference: INTEGER (1, 2, 4, . . .)<br>Semantics description: P (number of antenna ports for cell-specific reference signals) defined in TS 36.211. |
| Xxx Inactive | Presence: [M]<br>IE type and reference: NULL<br>Semantics description: Indicates that interference coordination by means of xxx pattern is not active. | where xxx could be RNB, RNTPB, RNS or RNR.
Note that
- If the enhancement IE in time domain is included in the LOAD INFORMATION message, the xxx Pattern Info IE indicates the subframes designated with indicated resource restriction by the transmitting eNB for the purpose of interference coordination. The receiving eNB may take such information into consideration when scheduling UEs.
- The receiving eNB may use the Measurement Subset IE received in the LOAD INFORMATION message, for the configuration of specific measurements towards the UE.
- The receiving eNB shall consider the received information as immediately applicable. The receiving eNB shall consider the value of the corresponding IE valid until reception of a new LOAD INFORMATION message carrying an update.
- If the restricted resource indicated in the xxx pattern info IE coincides with a MBSFN subframe, the receiving eNB shall consider that the subframe is designated as restricted resource by the transmitting eNB.

2. Resource Allocation Request [Proposal]

This section proposes mechanisms for resource allocation request from central node (CN) to its controlled eNB.

Resource Allocation Request

Solution 1:

The LOAD INFORMATION discussed in section 1 could be extended for resource allocation demanding from CN to eNB. For example if one cell receives the LOAD INFORMATION message with its CN ID as transmitting eNB ID and its cell ID as a cell ID indicated in the LOAD INFORMATION and corresponding to the resource allocation information, then this cell should think that the resource allocation information in this LOAD INFORMATION is the resource allocation demanding.

Figure 2:
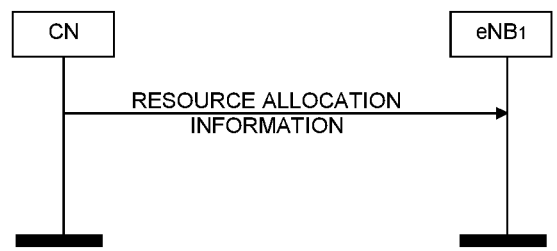
FIG. 2 illustrates a diagram of signaling transmission between a central node (CN) of the coordinated multiple points and a base station (namely, eNB)

Solution 2:

As shown in FIG. 2, the present disclosure proposes one new "RESOURCE ALLOCATION INFORMATION" message could be added for resource allocation demanding. If one cell receives the RESOURCE ALLOCATION INFORMATION message with its CN ID as transmitting eNB ID (or cell ID) and its cell ID as a cell ID indicated in the RESOURCE ALLOCATION INFORMATION message and corresponding to the resource allocation information, then this cell should think the resource allocation information in this RESOURCE ALLOCATION INFORMATION is the resource allocation demanding.

The "RESOURCE ALLOCATION INFORMATION" message proposed by the present disclosure above may include at least one of the following:
- Message Type with 'RESOURCE ALLOCATION INFORMATION'
- Cell ID of transmitting a message
- Cell Information with multiple Cell Information Items. Each item includes:
  - Cell ID
  - RNTP
  - RNB
  - RNS
  - ABS
  - or RNTPB/RNR In the above-mentioned resource allocation request, the present disclosure further proposes that the RNTP can be extended with maximal transmission power setting. For example, the following information may be added into RNTP information element.

| | |
|---|---|
| RNTP maximal transmission power | IE type and reference: ENUMERATED<br>(−∞, −11, −10, −9, −8, −7, −6, −5, −4, −3, −2, −1, 0, 1, 2, 3, . . .)<br>Semantics description: $RNTP_{max}$ is defined similar to $RNTP_{threshold}$ in TS 36.213 |

A plurality of preferred embodiments of the present disclosure are described above through specific information element setting and extension and enhancement of load information, and performance of resource allocation request by using newly-added information elements. It should be appreciated that the above depictions and settings are only exemplary, those skilled in the art, according to the content of the present disclosure, may envisage other setting manners and variation manners, for example, amending information items included in the information elements, and changing specific meaning of a certain information item. Such similar changes and substitutions also fall within the protection scope of the present disclosure.

Figure 3:
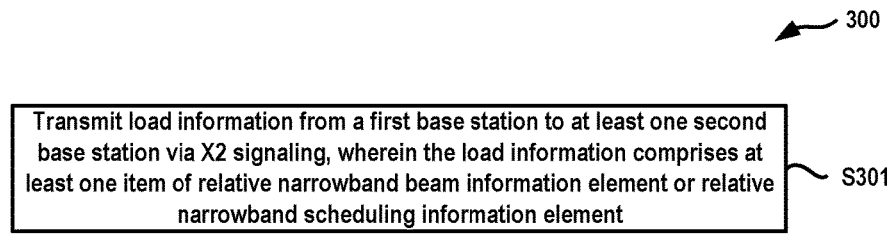
FIG. 3 illustrates a block diagram of a method of performing signaling transmission in a wireless communication network supporting coordinated multiple point transmission according to an embodiment of the present disclosure.

FIG. 3 illustrates a block diagram of a method of performing signaling transmission in a wireless communication network supporting coordinated multiple point transmission according to an embodiment of the present disclosure. As shown in FIG. 3, the method 300 comprises step S301. At step S301, the method 300 comprises transmitting load information from a first base station to at least one second base station via X2 signaling, wherein the load information comprises at least one item of relative narrowband beam information element or relative narrowband scheduling information element.

Although not shown, in an embodiment, the load information further comprises at least one item of relative narrowband transmission power information element, relative narrowband transmission power and beam information element or relative narrowband resource restriction information element.

In another embodiment, the relative narrowband beam information element is used to indicate DL beam restriction per PRB, per subband, per wideband, per carrier or per subframe in a cell and information needed by said at least one second base station upon performing interference aware scheduling.

In a further embodiment, the relative narrowband beam information element comprises at least one item of a narrowband beam list and number of antenna ports, and the relative narrowband beam list comprises at least one relative narrowband beam information item, wherein each relative narrowband beam information item comprises at least one item of relative narrowband beam pattern information, beam indication, rank indication and relative narrowband beam type.

In an embodiment, the relative narrowband beam information element comprises at least one item of relative narrowband beam list, number of antenna ports and transmission mode, wherein the relative narrowband beam list comprises at least one relative narrowband beam information item, wherein each relative narrowband beam information item comprises: at least one item of relative narrowband beam pattern information, beam information and relative narrowband beam type, and wherein the beam information comprises at least one beam information item, wherein each beam information item comprises at least one item of beam indication and rank indication, or the beam information comprises at least one item of codebook subset restriction and transmission mode. In another embodiment, one information element may only comprise one indication of transmission mode, similar to the number of antenna ports.

In another embodiment, the relative narrowband beam pattern information in time domain comprises at least one item of relative narrowband beam pattern information, number of cell-specific antenna ports, measurement subset and relative narrowband beam non-activation in a frequency division duplex mode or time division duplex mode.

In a further embodiment, the relative narrowband scheduling information element is used to indicate scheduling restriction per PRB, per subband, per wideband, per carrier or per subframe in a cell and information needed by said at least one second base station upon performing interference aware scheduling.

In an embodiment, the relative narrowband scheduling information element comprises at least one item of relative narrowband scheduling information list, user equipment information list and relative narrowband scheduling type, wherein the relative narrowband scheduling information list comprises at least one relative narrowband scheduling information item, wherein the number of relative narrowband scheduling information items in the list does not exceed a maximum value of the number of the defined relative narrowband scheduling information items, and each relative narrowband scheduling information item comprises relative narrowband scheduling pattern information, wherein the user equipment information list comprises at least one item of a global base station identifier, X2AP ID of base station and user equipment, user identifier and configuration for channel information.

In another embodiment, the relative narrowband scheduling pattern information in the time domain comprises at least one item of relative narrowband scheduling pattern information, number of cell-specific antenna ports, measurement subset and relative narrowband scheduling non-activation in a frequency division duplex mode or time division duplex mode.

In a further embodiment, the relative narrowband transmission power and beam information element are used to indicate restriction of at least one item of downlink transmission function or beam per PRB, per subband, per wideband, per carrier or per subframe in a cell and information needed by said at least one second base station upon performing interference aware scheduling.

In another embodiment, the relative narrowband transmission power and beam information element comprise at least one item of relative narrowband transmission power and beam information list, number of antenna ports and transmission mode, wherein the relative narrowband transmission power and beam information list comprises at least one relative narrowband transmission power and beam information item, wherein each relative narrowband transmission power and beam information item comprises at least one item of relative narrowband transmission power and beam pattern information, relative narrowband transmission power threshold, beam indication, rank indication and beam restriction type.

In an embodiment, the relative narrowband scheduling pattern information in the time domain comprises at least one item of relative narrowband transmission power and beam pattern information, number of cell-specific antenna ports, measurement subset and relative narrowband transmission power and beam non-activation in a frequency division duplex mode or time division duplex mode.

In a further embodiment, the relative narrowband resource restriction information element is used to indicate resource restriction per PRB, per subband, per wideband, per carrier or per subframe in a cell and information needed by said at least one second base station upon performing interference aware scheduling.

In a further embodiment, the relative narrowband resource restriction information element comprises at least one item of relative narrowband resource restriction information list, user equipment information list, user equipment restriction type and the number of antenna ports, wherein the relative narrowband resource restriction information list comprises at least one relative narrowband resource restriction information item, wherein each relative narrowband resource restriction information item comprises at least one item of the relative narrowband resource restriction pattern information, relative narrowband transmission function threshold, beam indication, and beam restriction type, and the user equipment information list comprises at least one item of a global base station identifier, X2AP ID of base station and user equipment, user identifier and configuration for channel information.

In another embodiment, the relative narrowband resource restriction pattern information in the time domain comprises at least one item of relative narrowband resource restriction pattern information, number of cell-specific antenna ports, measurement subset and relative narrowband resource restriction non-activation in a frequency division duplex mode or time division duplex mode.

In an additional embodiment, the load information further comprises an invoking indication, wherein the invoking indication comprises at least one item of the relative narrowband beam information element, relative narrowband scheduling information element, relative narrowband transmission power information element, relative narrowband transmission power and beam information element or relative narrowband resource restriction information element about the at least one second base station sent back from the at least one second base station to the first base station.

The above method 300 in combination with FIG. 3 describes various embodiments of the present disclosure. It may be appreciated that the present disclosure uses extension of the load information to perform excellent support for Coordinated Multiple Point transmission and improves communication efficiency and implements excellent coordination between transmission points through different information elements, and improves use efficiency of resources.

Figure 4:
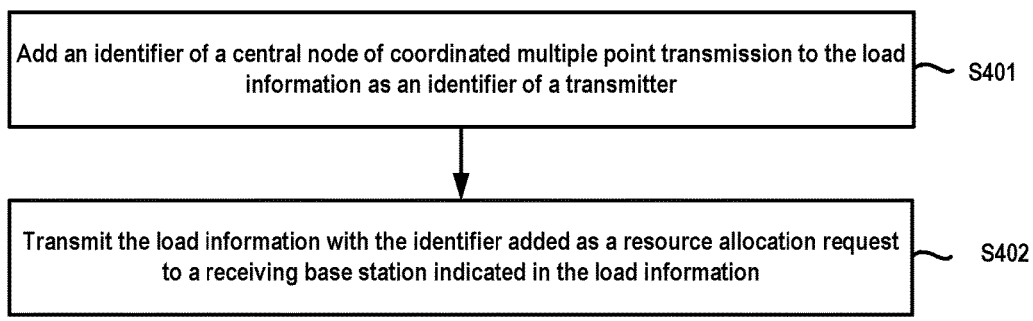
FIG. 4 illustrates a block diagram of method of using load information according to an embodiment of the present disclosure.

FIG. 4 illustrates a block diagram of method 400 of using load information according to an embodiment of the present disclosure. As shown in FIG. 4, at step S401, the method 400 comprises adding an identifier of a central node of coordinated multiple point transmission to the load information as an identifier of a transmitter. Then at step S402, the method 400 comprises transmitting the load information with the identifier added as a resource allocation request to a receiving base station indicated in the load information.

Although not shown, in an embodiment, the relative narrowband transmission power information element included in the load information comprises the setting of a maximum transmission power.

Figure 5:
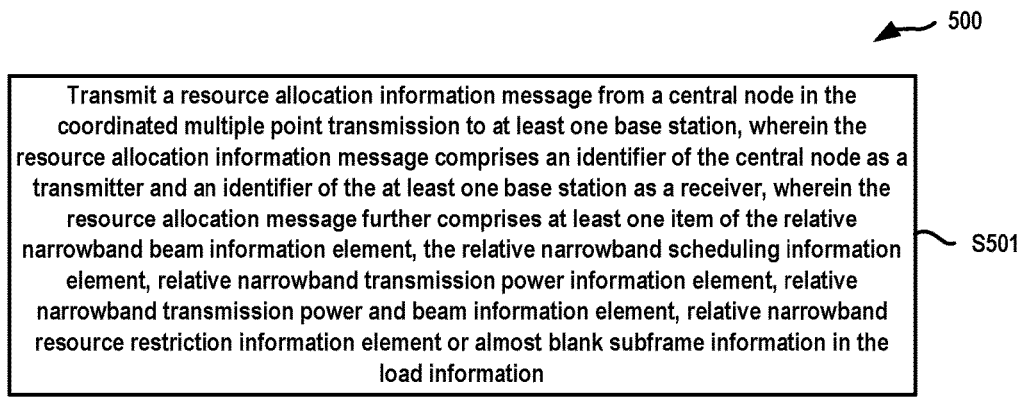
FIG. 5 illustrates a block diagram of a method of performing resource allocation in a wireless communication network supporting coordinated multiple point transmission according to an embodiment of the present disclosure.

FIG. 5 illustrates a block diagram of a method 500 of performing resource allocation in a wireless communication network supporting coordinated multiple point transmission according to an embodiment of the present disclosure. As shown in FIG. 5, the method 500 comprises a step S501 of transmitting a resource allocation information message from the central node in the coordinated multiple point transmission to at least one base station, wherein the resource allocation information message comprises an identifier of the central node as a transmitter and an identifier of the at least one base station as a receiver, wherein the resource allocation message further comprises at least one item of the relative narrowband beam information element, the relative narrowband scheduling information element, relative narrowband transmission power information element, relative narrowband transmission power and beam information element, relative narrowband resource restriction information element or almost blank subframe information in the above-mentioned load information.

Although not shown in the figure, in an embodiment, the relative narrowband transmission power information element comprises the setting of a maximum transmission power.

Figure 6:
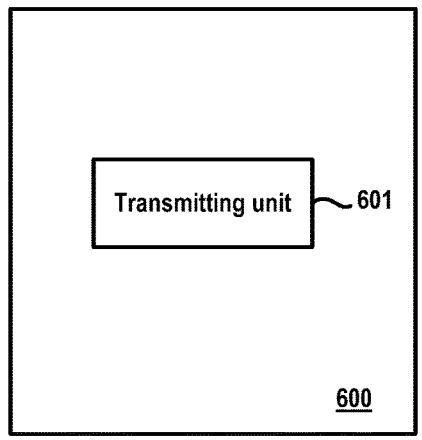
FIGS. 6-8 are block diagrams of an apparatus capable of respectively performing steps of the flow shown in FIGS. 3-5 according to the present disclosure.
Figure 7:
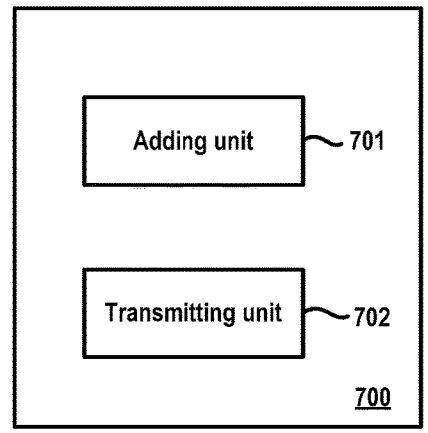
Figure 8:
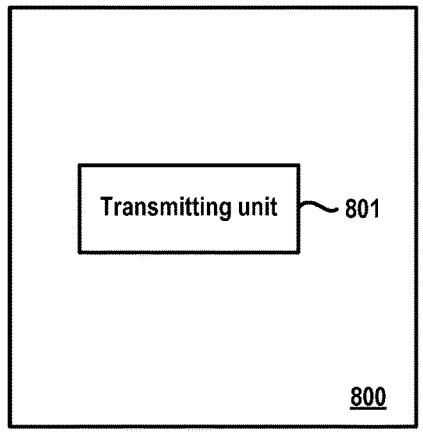

FIGS. 6-8 are block diagrams of an apparatus capable of respectively performing steps of the flow shown in FIGS. 3-5 according to the present disclosure.

Specifically, FIG. 6 illustrates an apparatus 600 for performing signaling transmission in a wireless communication network supporting coordinated multiple point transmission. The apparatus comprises a transmitting unit 601 for transmitting load information from a first base station to at least one second base station via X2 signaling, wherein the load information comprises at least one item of relative narrowband beam information element or relative narrowband scheduling information element. In an embodiment, the load information further comprises at least one of relative narrowband transmission power information element, relative narrowband transmission power and beam information element or relative narrowband resource restriction information element. Here, the apparatus 600 may be embodied as a base station, e.g., an eNB.

FIG. 7 illustrates an apparatus 700 of using the load information in methods 300-500. The apparatus 700 comprises an adding unit 701 for adding an identifier of a central node of coordinated multiple point transmission to the load information as an identifier of a transmitter. The apparatus 700 further comprises a transmitting unit 702 for transmitting the load information with the identifier added as a resource allocation request to a receiving base station indicated in the load information. The apparatus 700 may be embodied as the central node in the coordinated multiple point transmission, e.g., an eNB.

FIG. 8 illustrates an apparatus 800 for performing resource allocation in a wireless communication network supporting coordinated multiple point transmission. The apparatus comprises a transmitting unit 801 for transmitting a resource allocation information message from the central node in the coordinated multiple point transmission to at least one base station, wherein the resource allocation information message comprises an identifier of the central node as a transmitter and an identifier of the at least one base station as a receiver, wherein the resource allocation message further comprises at least one item of the relative narrowband beam information element, the relative narrowband scheduling information element, relative narrowband transmission power information element, relative narrowband transmission power and beam information element, relative narrowband resource restriction information element or almost blank subframe information in the above-mentioned load information. The apparatus 800 may be embodied as the central node in the coordinated multiple point transmission, e.g., an eNB.

To conclude, various embodiments of the present disclosure have been described in detail with reference to the accompanying drawings. Those skilled in the art would appreciate that the embodiments of the present disclosure may be implemented through hardware, software, firmware, modules, or combinations thereof, and the present disclosure may also be embodied in a computer program product set on a signal bearing medium available to any suitable data processing system. Such signal bearing medium may be a transmission medium or a recordable medium for machine-readable information, including magnetic medium, optical medium, or other appropriate medium. Examples of the recordable medium include: a magnetic disk or floppy disk in a hard disk driver, an optical disk for an optical driver, or a magnetic tape, and other mediums that can be envisaged by those skilled in the art. Those skilled in the art should be aware that any appropriate communication device having an appropriate programming device can perform the steps of the present methods embodied in a program product, as an example.

It should be noted that in order to make the present disclosure easier to understand, the above description omits some more specific technical details that are known to those skilled in the art but might be essential for implementing the present disclosure.

Although specific embodiments of the present disclosure have been disclosed, those skilled in the art would appreciate that specific embodiments may be altered without departing from the spirit and scope of the present disclosure. Therefore, the present disclosure is not limited to specific embodiments, and the appended claims include any and all such applications, modifications, and embodiments within the scope of the present disclosure.

What is claimed is:

1. A method of performing signaling transmission in a wireless communication network supporting coordinated multiple point transmission, the method comprising:
   transmitting load information from a first base station to at least one second base station via X2 signaling, wherein the load information comprises at least one item of relative narrowband beam information element configured to indicate downlink beam restrictions or relative narrowband scheduling information element configured to indicate scheduling restrictions;
   adding an identifier of a central node of coordinated multiple point transmission to the load information as an identifier of a transmitter; and
   transmitting the load information with the identifier added as a resource allocation request to a receiving base station indicated in the load information.

2. The method according to claim 1, wherein the load information further comprises at least one item of a relative narrowband transmission power information element, a relative narrowband transmission power and beam information element or a relative narrowband resource restriction information element; or
   the load information further comprises an invoking indication, wherein the invoking indication comprises at least one item of the relative narrowband beam information element, relative narrowband scheduling information element, relative narrowband transmission power information element, relative narrowband transmission power and beam information element or relative narrowband resource restriction information element about the at least one second base station sent back from the at least one second base station to the first base station.

3. The method according to claim 2, wherein the relative narrowband transmission power and beam information element are used to indicate restriction of at least one item of downlink transmission function or beam per physical resource block, per subband, per wideband, per carrier or per subframe in a cell and information needed by said at least one second base station upon performing interference aware scheduling.

4. The method according to claim 1, wherein the relative narrowband beam information element is used to indicate downlink beam restriction per physical resource block, per subband, per wideband, per carrier or per subframe in a cell and information needed by said at least one second base station upon performing interference aware scheduling wherein the relative narrowband beam information element comprises at least one item of a narrowband beam list and number of antenna ports, and the relative narrowband beam list comprises at least one relative narrowband beam information item, wherein each relative narrowband beam information item comprises at least one item of relative narrowband beam pattern information, beam indication, rank indication and relative narrowband beam type, or the relative narrowband beam information element comprises at least one item of a relative narrowband beam list, number of antenna ports and transmission mode, wherein the relative narrowband beam list comprises at least one relative narrowband beam information item, wherein each relative narrowband beam information item comprises: at least one item of relative narrowband beam pattern information, beam information and relative narrowband beam type, and wherein the beam information comprises at least one beam information item, wherein each beam information item comprises at least one item of beam indication and rank indication, or the beam information comprises at least one item of codebook subset restriction and transmission mode.

5. The method according to claim 4, wherein the relative narrowband beam pattern information in a time domain comprises at least one item of relative narrowband beam pattern information, number of cell-specific antenna ports, a measurement subset and relative narrowband beam non-activation in a frequency division duplex mode or time division duplex mode.

6. The method according to claim 1, wherein the relative narrowband scheduling information element is used to indicate scheduling restriction per physical resource block, per subband, per wideband, per carrier or per subframe in a cell and information needed by said at least one second base station upon performing interference aware scheduling.

7. The method according to claim 6, wherein the relative narrowband scheduling information element comprises at least one item of a relative narrowband scheduling information list, a user equipment information list and a relative narrowband scheduling type, and the relative narrowband scheduling information list comprises at least one relative narrowband scheduling information item, wherein the number of relative narrowband scheduling information items in the list does not exceed a maximum value of the number of the defined relative narrowband scheduling information items, and each relative narrowband scheduling information item comprises relative narrowband scheduling pattern information, wherein the user equipment information list comprises at least one item of a global base station identifier, X2AP identifiers of base station and user equipment, a user identifier and a configuration for channel information.

8. The method according to claim 1, wherein the relative narrowband transmission power information element included in the load information comprises the setting of a maximum transmission power.

9. A method of performing resource allocation in a wireless communication network supporting coordinated multiple point transmission, the method comprising:
   transmitting a resource allocation information message from a central node in the coordinated multiple point transmission to at least one base station, wherein the resource allocation information message comprises an identifier of the central node as a transmitter and an identifier of the at least one base station as a receiver, wherein the resource allocation message further comprises at least one item of a relative narrowband beam information element, a relative narrowband scheduling information element, a relative narrowband transmission power information element, a relative narrowband transmission power and beam information element, a relative narrowband resource restriction information element or almost blank subframe information in load information comprising:
- at least one item of relative narrowband beam information element configured to indicate downlink beam restrictions or relative narrowband scheduling information element configured to indicate scheduling restrictions, and an identifier of a central node of coordinated multiple point transmission to the load information as an identifier of a transmitter;
- wherein the load information further comprises at least one item of a relative narrowband transmission power information element, a relative narrowband transmission power and beam information element or a relative narrowband resource restriction information element; or
- the load information further comprises an invoking indication, wherein the invoking indication comprises at least one item of the relative narrowband beam information element, relative narrowband scheduling information element, relative narrowband transmission power information element, relative narrowband transmission power and beam information element or relative narrowband resource restriction information element about the at least one second base station sent back from the at least one second base station to the first base station.

10. The method according to claim 9, wherein the relative narrowband transmission power information element comprises the setting of a maximum transmission power.

11. An apparatus for performing signaling transmission in a wireless communication network supporting coordinated multiple point transmission, the apparatus comprising:
- a transmitter for transmitting load information from a first base station to at least one second base station via X2 signaling, wherein the load information comprises at least one item of a relative narrowband beam information element configured to indicate downlink beam restrictions or a relative narrowband scheduling information element configured to indicate scheduling restrictions; and
- a processor for adding an identifier of a central node of coordinated multiple point transmission to the load information as an identifier of a transmitter; and
- wherein the transmitter is further configured to transmit the load information with the identifier added as a resource allocation request to a receiving base station indicated in the load information.

12. The apparatus according to claim 11, wherein the load information further comprises at least one of the relative narrowband transmission power information element, relative narrowband transmission power and beam information element or relative narrowband resource restriction information element.

13. An apparatus for performing resource allocation in a wireless communication network supporting coordinated multiple point transmission, the apparatus comprising:
- a transmitter for transmitting a resource allocation information message from the central node in the coordinated multiple point transmission to at least one base station, wherein the resource allocation information message comprises an identifier of the central node as a transmitter and an identifier of the at least one base station as a receiver, wherein the resource allocation message further comprises at least one item of a relative narrowband beam information element, a relative narrowband scheduling information element, a relative narrowband transmission power information element, a relative narrowband transmission power and beam information element, a relative narrowband resource restriction information element or almost blank subframe information in the load information comprising:
  - at least one item of relative narrowband beam information element configured to indicate downlink beam restrictions or relative narrowband scheduling information element configured to indicate scheduling restrictions, and an identifier of a central node of coordinated multiple point transmission to the load information as an identifier of a transmitter;
- wherein the load information further comprises at least one item of a relative narrowband transmission power information element, a relative narrowband transmission power and beam information element or a relative narrowband resource restriction information element; or
- the load information further comprises an invoking indication, wherein the invoking indication comprises at least one item of the relative narrowband beam information element, relative narrowband scheduling information element, relative narrowband transmission power information element, relative narrowband transmission power and beam information element or relative narrowband resource restriction information element about the at least one second base station sent back from the at least one second base station to the first base station.

* * * * *